United States Patent Office 3,386,854
Patented June 4, 1968

3,386,854
SURFACE TREATMENT OF FRESHLY POURED
CONCRETE AND CEMENT MORTAR
Francis Sautier, Fontainebleau, France, assignor to Société
Anonyme dite: Les Oxydes Francais, Paris, France
No Drawing. Filed Dec. 9, 1963, Ser. No. 329,315
Claims priority, application France, Dec. 10, 1962,
918,036
4 Claims. (Cl. 117—123)

ABSTRACT OF THE DISCLOSURE

To avoid flaking and cracking due to sweating in freshly poured concrete and to improve its hardening and appearance, an aqueous emulsion of a resin is applied to the surface of the concrete prior to setting but during the sweating. About 1.1 to 1.5 mg. of resin per cm.$^2$ of surface is desirable. Suitable resins include polyvinyl acetate, polyvinyl chloride, acrylic, copolymers thereof, and mixtures thereof.

---

It is known that when a concrete or cement mortar is prepared, at the moment of vibration and tamping, a reflux of excess water known as "sweat" is formed which draws cement out of the sand, thus impoverishing the underlying layer.

Consequently the surface, instead of being homogeneous, is constituted of two layers which are distinct from the mass of the mortar or of the concrete, an exterior fragile layer of pure cement, which is glossy and hard, of uneven shade and mottled, and an underlying layer of sand and mortar with decreased cement content which is liable to disintegrate and be porous.

The thin exterior layer of pure cement has a coefficient of contraction which is higher than that of the impoverished underlying layer and this causes small fissures and cracks known as "cracking" and flaking in areas. Moreover when pressure is applied to the surface (rolling for example), the exterior layer is pulverized by being crushed on the hard surfaces of the sand of the impoverished underlying layer.

The effect of this action is increased if the cement tends to dehydrate by evaporation of the sweat. To avoid this it has hitherto been necessary to have recourse to such operations of preparation and treatment after setting as, the sprinkling of cement on the surface of the concrete or cement mortar in order to absorb the excess of water and to thicken the layer of pure cement; but this method only postpones the problem and does not solve it, since the contraction, fissuring and cracking actually increases. Or again the amount of mixing water was cut down in order to reduce sweating to a minimum. However this method makes it very difficult to obtain a smooth surface, results in unevenness and still does not prevent the cement being drawn upwards.

In both cases, after setting, prolonged watering was undertaken or else the application of a continuous insulating film in order to avoid dehydration and too great contraction of the layer of pure cement. But however great the care taken, results have never been completely satisfactory: neither with respect to contraction, since the two juxtaposed layers on the mass of mortar or of concrete have different coefficients of contraction and create differential contraction stresses which result in an internal stress gradient in the mass, the consequences of which sometimes have deep repercussions, nor with regard to the powdering and the cracking, since there is the superposition of a hard but fragile layer upon a crumbly layer.

The present invention has as an object a new process for the treatment of the surfaces of concrete and cement mortar when newly poured, allowing the above-mentioned disadvantages to be completely or substantially avoided, and also to prevent or minimize the separation of sand and cement on the surface and at the same time preserve homogeneity between the constituent parts of concrete or of cement waters by means of isolation of the cement in its liquid stage before setting, at the level which it is normally to occupy around the grains of sand.

To this end, the process according to the invention consists in applying to the surface of concrete or of cement mortar, before setting and during sweating, an aqueous emulsion of a resinous substance or a hydrophobic (water-repelling) elastomer in sufficient quantity to form a reticulation network preventing the cement from being drawn up into the sweat and allowing the excess water to pass, but holding back the cement. However, the quantity of hydrophobic substance must be insufficient to form a continuous film.

Examples of such resins or hydrophobic elastomer liquid homopolymers, such as polyvinylacetate and polyacrylates, and liquid copolymers of an acrylate with vinyl chloride or vinyl acetate which will form emulsions with water, such as the following;

polyvinyl acetate emulsions,
emulsions of copolymers based on polyvinyl chloride,
emulsions of acrylic resins,
mixed emulsions of acrylic resins and polyvinyl acetate, or
emulsions of butyl rubber.

These emulsions preferably contain a quantity of the order of 1 part by weight of resin or elastomer to 7 to 9 parts by weight of water.

The application of the aqueous emulsion of resin or hydrophobic elastomer may be effected by simple spraying of the said emulsion on the surface of the concrete or of the cement mortar covered with sweat.

At the moment when the aqueous emulsion of resin or hydrophobic elastomer, the pH value of which is within the acid range, enters into contact with the sweat, the pH value of which is strongly basic, it breaks up as a result of the change of pH value, and the resin or elastimer separates from its aqueous carrier and is fixed by affinity to the solid materials of opposing electrical charge contained in the sweat, thus forming a filtering reticulated network.

A very small quantity of the emulsion, for example corresponding to 1.5 mg. of resin or elastomer per sq. cm. of surface to be treated, is sufficient to form this reticulated network.

The aqueous emulsion of resin or elastomer must be sufficiently stable so that when the said emulsion enters into contact with the sweat, sufficient time must pass, of the order of 2 to 3 minutes, before the break-up of the emulsion takes place, that is to say, the separation between the resin and its dispersion water.

This is necessary for the emulsion to be able to mix well into the sweat. This minimum time is equally desirable so that the resin does not agglomerate too quickly in large flakes, which would counteract the formation of a reticulated network sufficiently fine to hold back the small particles of cement.

The pH value of the emulsion may differ according to the nature of the resins, and must be adjusted for each resin contemplated since the break-up time of the emulsion depends as much on this as on the nature of the product. The mixing time must not be too long (less than 5 minutes) since if the separation is too slow the resin may penetrate in depth and allow the cement to be drawn upwards. The cement can then not be returned to its normal level.

Thus, an emulsion of polyvinyl acetate must have a pH value of 4.6 to 4.8, while that of an acrylic resin must be 6.7 to 7, and a mixture of acrylic resins/polyvinyl acetate must be 6.2 to 6.4.

The pH value of the cement sweat is generally between pH 12 and pH 13.

The condensation of the resins is evidently a function of the modification of the pH value of the emulsion/sweat combination.

The advantages obtained by the process according to the invention are as follows:

(a) The disappearance of the two layers at the surface, one of pure cement and the other of impoverished mortar, and the extension up to the extreme surface, of the same material as that which constitutes the mass of mortar or of concrete with its characteristics of hardness and intrinsic mechanical properties—hence the disappearance of micro-fissures (cracking), and crumbling (powdering) and of differential contraction (fissuration), (b) The obtaining of vary hard surfaces, which are homogeneous without any mottling or trace of diffusion of cement, having a matt and wrinkled appearance.

(c) There is no necessity for any special treatment after setting (e.g. dampening, or the application of a film of an insulating material).

In order that the invention may be more clearly understood, reference will now be made to the following specific examples, which are given purely by way of illustration.

Example 1

A covering layer was made from mortar blocks of 25 sq. m. in area and 3 cm. in thickness. The mortar was constituted by:

Seine sand 0–6, well washed _____cu. metre__  1
Portland cement type CPA 210/325 _____kg.__  500
Mixed with 240 l. of ordinary water.

After mixing, the mortar was laid with a tamping board in the usual manner, and then vibrated by means of a vibrating marking and finally smoothed.

A liquid sweat of about 2 mm. in thickness then appeared on the surface of the mortar.

This sweat was then diluted to one quarter by an aqueous emulsion of a liquid copolymer of vinyl chloride and an acrylate (containing 50% resin having a pH of about 6.7), the resin being sprayed on the surface of the mortar.

The amount spread on the surface was of the order of 100 grams of solution or 12.5 grams of resin per sq. metre. The appearance of this sweat then became slightly opalescent. It was found that the sweat was deprived of cement after about 10 minutes.

After 24 hours, all the water on the surface had evaporated and the appearance of the mortar was as follows; matt wrinkled surface perfectly homogeneous in colour, with no trace of pure cement on the surface, which showed that the surface was constituted exactly of the same material as the centre of the whole mass.

The sample block was mottled and shiny in appearance thus showing the characteristics of the migration of cement on the surface.

After a normal hardening process of 7 days, scratching with a steel point indicated that the surface was not crumbling and detection or developing means also indicated complete absence of cracking.

A reference block constituted of the same mortar but not subjected to the resin pulverisation treatment according to the invention showed after a hardening period of 7 days the conventional appearance characterised by the cement being drawn upwards to the surface with all the disadvantages of crumbling and cracking previously described.

After being exposed to dry hot air for a month, it was shown that the block of mortar treated according to the invention had an extremely hard surface while the surface of the reference block was powdery and cracked and could be easily scratched and crumbled.

Moreover the colour of the surface treated according to the invention was darker than that of the reference block, thus proving that there had been no excessive desiccation in the block treated according to the invention while in contact with hot air.

Example 2

A finishing concrete of 10 cm. in thickness was made with the following composition:

Fine gravel 8–25 _____l__  800
Seine sand 0–6 well washed _____l__  400
Portland cement type CPAL 210/325_____kg__  400
Mixing water _____l__  175

The concrete was made in blocks of 5 m. by means of a vibrating tamping board, it was then smoothed with mechanical trowel. The sweat was of the order of 3 mm. An aqueous emulsion of polyvinyl acetate containing 55% resin and having a pH of about 6.7 diluted to ⅕ by means of 100 cu. cms. of dilute emulsion per sq. metre or 11 grams of dry resin per sq. metre, was sprayed on its surface.

The same observations were made as in the case of the mortar in Example 1.

It will be understood that the invention has been described only by way of example and that various modifications may be made to the specific details referred to without in any way departing from the scope thereof as defined by the appended claims.

I claim:

1. A method for treating the surface of freshly poured concrete and cement mortars, said concrete and cement mortars having a basic pH, in order to avoid powdering and cracking due to sweating and to improve the hardening and appearance of said concrete, comprising applying to said surface before setting, but during sweating thereof, an aqueous emulsion, said emulsion having a pH of about 4.6–7.0, of a substance selected from the group consisting of:

(a) a liquid homopolymer selected from the group consisting of polyvinylacetates, polyacrylates, and mixtures thereof, and (b) a liquid copolymer of an acetate with vinyl chloride or vinyl acetate, said emulsion containing one part by weight of said liquid homopolymer or said liquid copolymer with about seven to nine parts by weight of water, the applied quantity of said emulsion being from about 1.1 to 1.5 mg. per sq. cm. of surface to be treated.

2. A method according to claim 1, wherein the aqueous emulsion is of polyvinyl acetate and has a pH of 4.6 to 4.8.

3. A method according to claim 1, wherein the aqueous emulsion is of polyacrylate and has a pH of 6.7 to 7.

4. A method according to claim 1, wherein the aqueous emulsion is a mixture of polyacrylate and polyvinyl acetate and has a pH value of 6.2 to 6.4.

References Cited

UNITED STATES PATENTS

| | | |
|---|---|---|
| 2,000,759 | 5/1935 | Johnson. |
| 2,240,778 | 5/1941 | Hunt _____ 264—79 |
| 2,839,811 | 6/1958 | Benedict et al. ____ 117—123 X |
| 2,928,752 | 3/1960 | Felletschin _____ 117—123 |

ALFRED L. LEAVITT, *Primary Examiner.*

H. COHEN, *Assistant Examiner.*